United States Patent

[11] 3,582,697

| | | |
|---|---|---|
| [72] | Inventors | John Bochan;<br>Robert M. Fey, both of Louisville, Ky. |
| [21] | Appl. No. | 6,486 |
| [22] | Filed | Jan. 28, 1970 |
| [45] | Patented | June 1, 1971 |
| [73] | Assignee | General Electric Company |

[54] COMBINATION MOTOR-CLUTCH APPARATUS
5 Claims, 2 Drawing Figs.

[52] U.S. Cl. ................................................. 310/78,
192/84
[51] Int. Cl. ...................................................... H02k 7/10
[50] Field of Search ........................................... 310/78, 76,
77, 105, 96, 98, 164; 192/84.02

[56] References Cited
UNITED STATES PATENTS
1,459,358   6/1923   Buchenberg .................   310/78X 3,448,308   6/1969   Pervorse et al. ..............   310/41

Primary Examiner—D. X. Sliney
Attorneys—James E. Espe, Walter E. Rule, Frank L. Neuhauser, Oscar B. Waddell and Joseph B. Forman ABSTRACT: A combination motor-clutch apparatus in which an electrically operated clutch is arranged in an integral assembly with a driving motor. The control member of the clutch comprises an electromagnetic coil which induces a magnetic field for bringing the clutching surfaces into operative engagement. The coil is mounted on an end shield of the motor by means of tabs which are pierced out of the end shield. The tabs additionally serve as a flux path for passing the magnetic field of the coil to the movable clutch means, while the openings in the end shield created by the formation of the tabs provide a means for cooling airflow to pass through the clutch and the motor.

PATENTED JUN 1 1971 3,582,697

INVENTORS
JOHN BOCHAN
& ROBERT M. FEY
BY
James E. Espe
THEIR ATTORNEY

COMBINATION MOTOR-CLUTCH APPARATUS

BACKGROUND OF THE INVENTION

This invention relates to a combination motor-clutch apparatus and particularly to such an apparatus in which the clutch is of the electromagnetic type.

Electromagnetic clutches are sometimes incorporated in the drive systems of automatic washing machines and such appliances to provide a means whereby the user may have a wide selection of operating speeds to suit various types of fabric loads. Such clutches are ordinarily, however, assembled as a separate and distinct assembly from the driving motor and are subsequently mounted on the armature shaft of the driving motor. Because the clutch and driving motor are ordinarily separate and distinct assemblies, a significant amount of space must be provided within washing machine cabinet for the positioning of these assemblies. It is desirable in order to save space and in order to reduce the manufacturing cost of the separate drive motor and clutch assemblies to combine these assemblies into a single compact unit embodying a minimum number of parts.

It is therefore an object of my invention to provide a combination motor-clutch apparatus which is simple, inexpensive, and compact in design.

SUMMARY OF THE INVENTION

A combination motor-clutch assembly is provided comprising an electric motor having a rotor, a stator, a rotatable shaft mounting said rotor, and at least one end shield carrying bearing means for the shaft. An electric clutch is provided having a clutch input member driven by the shaft, a clutch output member mounted around the shaft and rotatable with respect to the shaft, and an electromagnetic coil for inducing a magnetic field to bring the input member and the output member into operative engagement. At least one of the clutch members is axially movable to effect such engagement. The clutch is positioned around the shaft adjacent the end shield of the motor. The end shield has a coil mounting means formed integrally therewith for supporting the electromagnetic coil of the clutch. The coil mounting means also serves as a flux path for the magnetic field produced by the coil to pass the flux to the axially movable clutch member. By this arrangement, an integral assembly is provided in which one end shield acts as a magnetic path in the electric clutch as well as a structural art of both the motor and the clutch.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
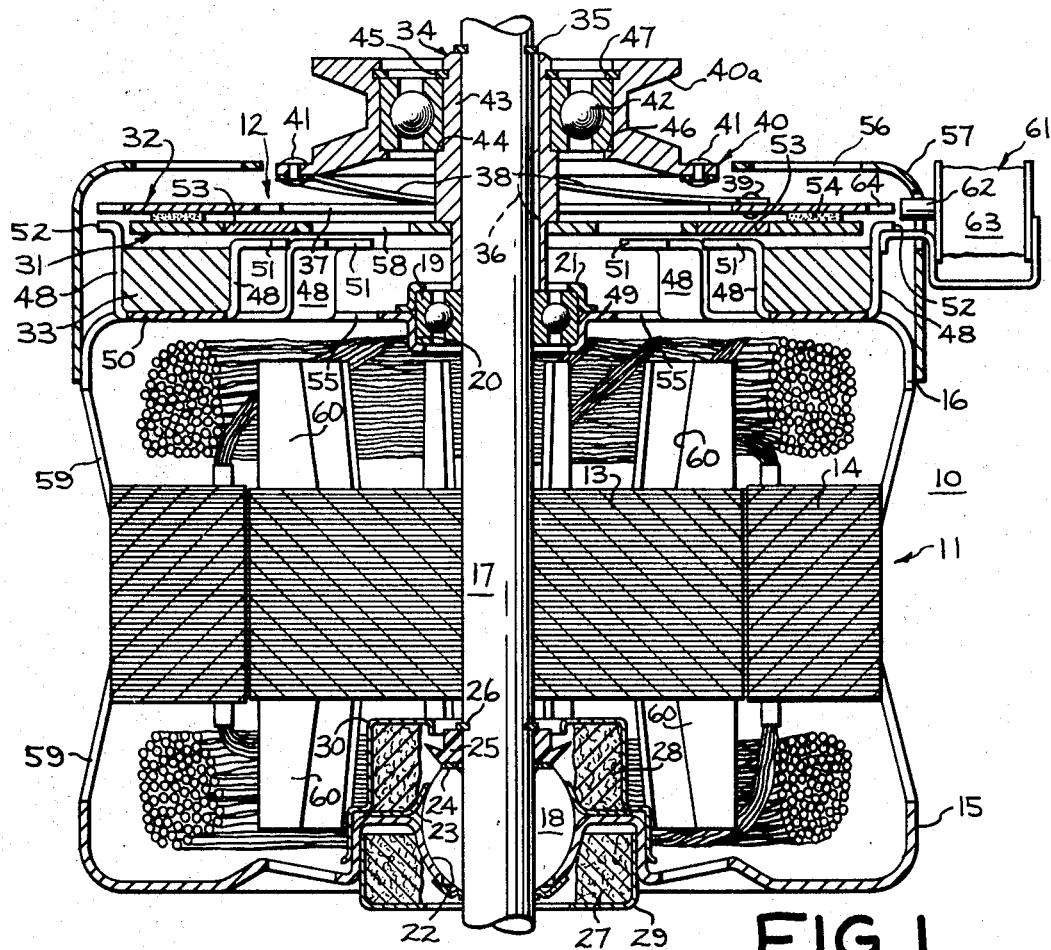
FIG. 1 is a cross-sectional elevational view of one embodiment of the combination motor-clutch apparatus of the invention.

Referring now to the drawing, and initially to FIG. 1 thereof, there is illustrated a new and improved integrated motor-clutch apparatus 10 including an electric motor generally indicated by the numeral 11 and an electric clutch generally indicated by the numeral 12. The motor 11 includes a rotor 13 and a stator 14. The stator 14 comprises a laminated steel assembly to which are welded end shields 15 and 16 which mount bearings for rotor shaft 17. Specifically, a sleeve bearing 18 is supported by end shield 15 and a ball bearing 19 is carried by end shield 16. It will be seen that ball bearing 19 is pressed into an annular recess 20 formed in end shield 16 and is held in place by a cap member 21 spot welded to the end shield 16. Sleeve bearing 18 is similarly supported by a recess 22 formed in end shield 15 and is held in place by a flanged cap member 23 spot welded to the end shield 15. Positioned adjacent sleeve bearing 18 on shaft 17 is a thrust plate 24 and a molded thrust washer 25 which also acts as an oil slinger. A snap ring 26 holds thrust washer 25 in place on the shaft. Oil reservoirs 27 and 28, defined in part by members 29 and 30 pressed onto end shield 15, contain felt wicks which are adapted to hold a supply of lubricant and deliver it to sleeve bearing 18.

Electric clutch 12 is positioned around rotor shaft 17 adjacent end shield 16, and includes an input member 31 driven from shaft 17, an output member 32 mounted around shaft 17 and rotatable relative thereto, and an electromagnetic clutch coil 33 for inducing a magnetic field to bring input member 31 and output member 32 into operative engagement. In the preferred embodiment shown, output member 32 is axially movable relative to input member 31 for engagement therewith.

Clutch input member 31 comprises a disclike structure which is rigidly connected to and supported by an elongate bushing 34. Bushing 34 positioned on shaft 17 between bearing 19 and a snap ring 35, and is keyed to shaft 17 for rotation therewith by means of a Woodruff key 36. Clutch output member 32 comprises an annular disc having a relatively large central opening 37 formed therein and having a plurality of leaf springs 38 secured at one end thereof to output member 32 by means of rivets 39. Leaf springs 38 extend upwardly in a somewhat circumferential fashion where they are secured to a driven member 40 by means of rivets 41. By this arrangement, output member 32 is supported from driven member 40 by leaf springs 38 which permit output member 32 to move axially relative to driven member 40.

Driven member 40 comprises an output pulley 40a which is rotatably mounted on shaft 17 for free rotation relative thereto. Pulley 40a is supported by a ball bearing 42 from bushing 34, the bearing 42 being mounted on a reduced diameter end section 43 of bushing 34 and being restrained from axial movement relative to bushing 34 on one side by a shoulder 44 and on the other side by a snap ring 45. Pulley 40a is likewise restrained from axial movement relative to bearing 42 on one side by a shoulder 46 and on the other side by a snap ring 47.

Figure 2:
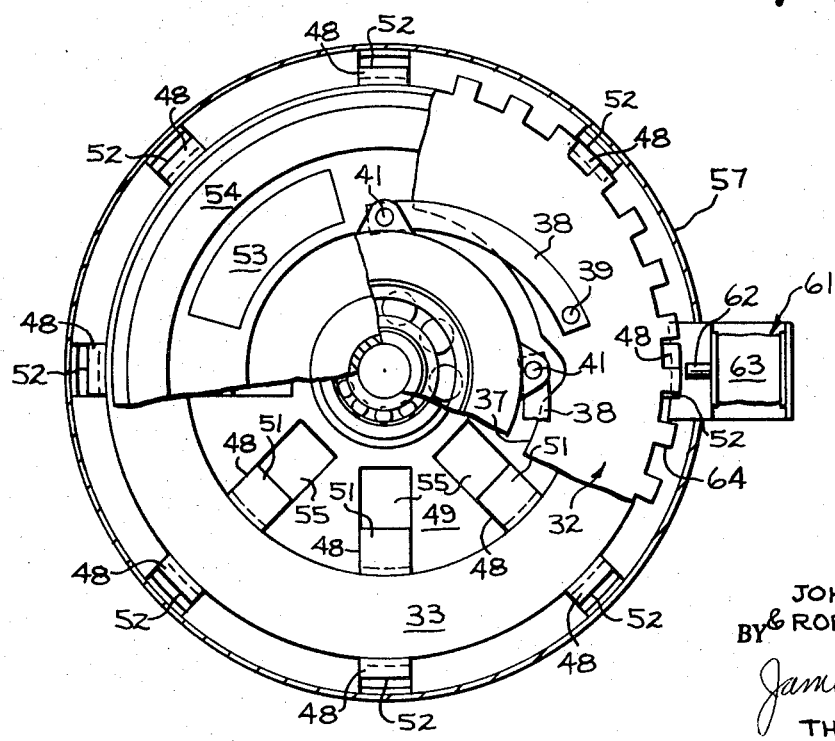
FIG. 2 is a plan view of the apparatus of FIG. 1, the view being partially cut away to show details.

In accordance with one important aspect of out invention, end shield 16 has mounting means formed integrally therewith for supporting electromagnetic clutch coil 33. In the preferred embodiment such coil mounting means comprises a plurality of tabs 48 formed on the upper or outer surface 49 of end shield 16 and projecting toward the clutch members 31 and 32. As is best seen in FIG. 2, tabs 48 are arranged in two radially spaced annular rows. Returning to FIG. 1, it will be seen that such an arrangement of tabs provides an interrupted recess 50 adapted to accommodate and support the clutch coil 33.

In addition to serving as a means of support for coil 33, the coil mounting means or tabs 48 additionally serve as a flux path for the magnetic field produced by the coil. This is to say that another important feature of our invention is that tabs 48 serve not only as a means of support for coil 33, but also as a means for passing magnetic flux to the axially movable clutch output member 32. More specifically, each of the tabs 48 extends slightly above the upper surface of clutch coil 33, where the inner row of tabs have integrally formed transversely extending outer tips 51 positioned adjacent the lower surface of disclike input member 31, while the outer row of tabs have integrally formed transversely extending outer tips 52 positioned adjacent the lower surface of output member 32. Disclike input member 31 includes a plurality of circumferentially spaced spaced inserts 53 of a suitable magnetic material such as low carbon steel, while the remainder of the disclike input member 31 comprises a substantially nonmagnetic material such as aluminum or zinc. Inserts 53 serve to conduct the magnetic flux from coil 33 upwardly to the axially movable clutch output member 32 which comprises a magnetic material. By this arrangement, a magnetic flux path is completed from coil 33 through tab tips 51 through output member 32 to tab tips 52 and back to coil 33. With such a flux path, when current flow is induced through coil 33, output member 32 will be attracted toward input member 31. Depending upon the magnitude of the current flow through coil 33, the magnetic circuit will produce a greater or lesser attraction of the output member 32 toward the input member 31, it being understood that leaf springs 38 normally bias output member 32 upwardly to a position where the output member 32 is spaced apart from input member 31.

An annular formation 54 of suitable friction material such as cork is bonded to the clutch input member 31. By this arrangement, when output member 32 is drawn toward input member 31 by an increasing current flow through coil 33 and hence an increasing flow of magnetic flux issuing therefrom, the friction material 54 will make contact with the lower surface of the output member and torque from the rotor shaft 17 will be transferred from the input member to the output member.

As has been previously pointed out, the formation of tabs 48 from end shield 16 serves two important functions; firstly, to support coil 33; and secondly, to aid in the magnetic coupling to the axially movable clutch output member 32. However, as still another important feature of our invention it should be realized that such a formation of tabs 48 from end shield 16 performs a third function, namely to provide a path for the flow of cooling air through the motor-clutch assembly. In this regard it will be seen that the tabs which are located on the radially inward side of coil 33 are pierced out of end shield 16 leaving a plurality of airflow openings 55 therethrough. By this arrangement, cooling air may be drawn through openings 56 in clutch cover 57, through central opening 37 of output member 32 through openings 58 in input member 31, through openings 55 in end shield 16 and into motor 11, where the cooling air may be discharged through openings 59. It will be realized that rotor 13 may be formed with vanes 60 on the upper and lower portions thereof to augment such a flow of cooling air.

In order to regulate the torque transmitted by clutch 12 from rotor shaft 17 to output pulley 40a, an appropriate control circuit including an output speed sensor 61 may be used to connect coil 33 to a source of electrical energy. Speed sensor 61 is representatively shown as being a tachometer generator including a permanent magnet core 62 and a coil 63. The outer periphery of output member 32 may be provided with a plurality of circumferentially spaced teeth 64 thereon which rotate adjacent core 62. This produces a change in reluctance of the core 62 whereby a voltage is induced in the coil 63. By this arrangement, an electrical signal is produced within coil 63 which is proportional to the output speed of the clutch 12. The signal so produced may then be fed to an appropriate control circuit to regulate the current flow through coil 33. Reference is made to U.S. Pat. No. 3,483,719 issued Dec. 16, 1969, to D. S. Heidtmann and assigned to the assignee of the instant invention, wherein a control circuit adapted to control a clutch of the type utilized in my invention is disclosed and claimed in detail.

As was previously mentioned, my system is particularly adapted for use in automatic clothes washers and other such appliances wherein it is desirable to reduce the space which would be required for separate motor and clutch assemblies, and wherein it is desirable to reduce the manufacturing cost by forming the motor and clutch in an integral assembly. From the foregoing description it should now be apparent that the present invention by employing in a motor-clutch combination, a motor end shield which acts as a magnetic path in the electric clutch as well as a structural part of both the motor and clutch, provides such an integral assembly which is extremely simple in design and much less expensive to manufacture than are separate motor and clutch assemblies.

As will be evident from the foregoing description, certain aspects of the invention are not limited to the particular details of construction of the example illustrated, and it is contemplated that various modifications or applications will occur to those skilled in the art. It is therefore intended that the appended claims shall cover such modifications and applications as do not depart from the true spirit and scope off the invention.

What we claim as new and desire to secure by Letters Patent of the United States is:

1. A combination motor-clutch assembly comprising:
   a. an electric motor having a rotor, a stator, a rotatable shaft mounting said rotor, and at least one end shield carrying bearing means for said shaft;
   b. an electric clutch having a clutch input member driven from said shaft, a clutch output member mounted around said shaft and rotatable with respect to said shaft, and an electromagnetic coil for inducing a magnetic field to bring said input member and said output member into operative engagement, at least one of said clutch members being axially movable to effect such engagement;
   c. said clutch being positioned around said shaft adjacent said end shield of said motor, and said end shield having coil mounting means formed integrally therewith for supporting said electromagnetic coil of said clutch; and
   d. said coil mounting means comprising a plurality of upstanding tabs formed on the outer surface of said one end shield and projecting toward said clutch members, said tabs being arranged in two radially spaced annular rows to form an interrupted recess accommodating said coil and including transversely extending outer tips aiding in the magnetic coupling to the axially movable clutch member so that said coil mounting means also serves as a flux path for the magnetic field produced by said coil to pass said flux to the axially movable clutch member;
   e. whereby an integral assembly is provided in which said one end shield acts as a magnetic path in the electric clutch as well as a structural part of both the motor and the clutch.

2. The motor clutch assembly of claim 1 in which at least a portion of said tabs are located on the radially inward side of said coil and are formed out of said end shield to provide airflow openings through said end shield.

3. A combination motor-clutch assembly comprising:
   a. an electric motor having a rotor, a stator a rotatable shaft mounting said rotor, and at least one end shield carrying bearing means for said shaft;
   b. an electric clutch having a clutch input member driven from said shaft, a clutch output member mounted around said shaft and rotatable with respect to said shaft, and an electromagnetic coil for inducing a magnetic field to bring said input member and said output member into operative engagement, said clutch output member being axially movable relative to said clutch input member for engagement therewith, said output member being operatively connected to a driven member, said driven member being rotatably mounted on said rotatable shaft for free rotation with respect to said shaft and comprising an output pulley, said clutch output member being mounted on said pulley by a plurality of leaf springs;
   c. said clutch being positioned around said shaft adjacent said end shield of said motor, and said end shield having coil mounting means formed integrally therewith for supporting said electromagnetic coil of said clutch; and
   d. said coil mounting means also serving as a flux path for the magnetic field produced by said coil to pass said flux to the axially movable clutch member;
   e. whereby an integral assembly is provided in which said one end shield acts as a magnetic path in the electric clutch as well as a structural part of both the motor and the clutch.

4. In a motor-clutch assembly including an electric driving motor, and an electrically controlled driven clutch having an axially movable clutch element and an electromagnetic operating coil, means for mounting said coil integrally with said motor comprising:
a plurality of tabs formed on one end shield of said motor, said tabs being arranged in two radially spaced rows to form an annular recess for receiving and holding said coil, and said tabs being pierced out of said end shield to form airflow openings therethrough and extending toward said movable clutch element to form a flux path between said coil and said clutch element.

5. The apparatus of claim 4 in which said tabs include transversely extending tips at their outer ends to aid in the magnetic effect of said coil on said clutch member.